US010705048B2

(12) United States Patent
Okumura

(10) Patent No.: US 10,705,048 B2
(45) Date of Patent: Jul. 7, 2020

(54) MASS SPECTROMETER

(71) Applicant: SHIMADZU CORPORATION, Kyoto-shi, Kyoto (JP)

(72) Inventor: Daisuke Okumura, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/320,673

(22) PCT Filed: Jul. 27, 2016

(86) PCT No.: PCT/JP2016/072002
§ 371 (c)(1),
(2) Date: Jan. 25, 2019

(87) PCT Pub. No.: WO2018/020600
PCT Pub. Date: Feb. 1, 2018

(65) Prior Publication Data
US 2019/0162697 A1 May 30, 2019

(51) Int. Cl.
*G01N 27/62* (2006.01)
*H01J 49/42* (2006.01)
*H01J 49/40* (2006.01)

(52) U.S. Cl.
CPC ............ *G01N 27/62* (2013.01); *H01J 49/401* (2013.01); *H01J 49/429* (2013.01); *H01J 49/4215* (2013.01)

(58) Field of Classification Search
USPC ................................ 250/292, 290, 287, 281
See application file for complete search history.

(56) References Cited

U.S. PATENT DOCUMENTS 6,987,264 B1 1/2006 Whitehouse et al.
8,410,430 B2 4/2013 Kenny et al.
(Continued)

FOREIGN PATENT DOCUMENTS

CA 2 772 677 A1 3/2011
EP 2 474 021 A1 7/2012
(Continued)

OTHER PUBLICATIONS

Written Opinion dated Oct. 11, 2016 in application No. PCT/JP2016/072002.
(Continued)

*Primary Examiner* — Kiet T Nguyen
(74) *Attorney, Agent, or Firm* — Sughrue Mion, PLLC

(57) ABSTRACT

When a normal mass spectrometry is performed without dissociating an ion, the m/z range limitation voltage setting unit applies a radio-frequency voltage to each rod electrode of the quadrupole mass filter and controls the quadrupole voltage generator so as to apply a direct current voltage smaller than that at the time of ion selection for MS/MS spectrometry. When a small direct current voltage is applied, a mass scanning line is set so as to pass through a stability region on a Mathieu diagram over a long range, hence large m/z ions that do not fall within the stability region are blocked in the quadrupole mass filter. By adjusting a cut-off point on larger m/z side blocked in accordance with the measurement period of OA-TOFMS including the orthogonal accelerator, heavy ions that cause period delay are prevented from being introduced into the orthogonal accelerator.

4 Claims, 7 Drawing Sheets

(56) References Cited

U.S. PATENT DOCUMENTS

| | | | | |
|---|---|---|---|---|
| 9,536,723 | B1 * | 1/2017 | Bertsch | H01J 49/063 |
| 2008/0248585 | A1 * | 10/2008 | Chen | G01N 33/6824<br>436/89 |
| 2011/0057095 | A1 | 3/2011 | Loboda | |
| 2011/0215235 | A1 * | 9/2011 | Schoen | H01J 49/26<br>250/282 |

FOREIGN PATENT DOCUMENTS

| | | | |
|---|---|---|---|
| JP | 2013-504146 | A | 2/2013 |
| WO | 2011/026228 | A1 | 3/2011 |

OTHER PUBLICATIONS

Communication dated Jun. 17, 2019, from the European Patent Office in application No. 16910503.8.

International Search Report of PCT/JP2016/072002 dated Oct. 11, 2016 [PCT/ISA/210].

"Agilent 6500 Series Q-TOF LC/MS System", [online], Agilent Technologies, [searched on Jun. 21, 2016], Internet Cited beginning on p. 4 of Specification.

International Search Report of PCT/JP2016/072002 dated Oct. 11, 2016 [PCT/ISA/210], English Translation.

* cited by examiner

MASS SPECTROMETER

CROSS REFERENCE TO RELATED APPLICATIONS

This application is a National Stage of International Application No. PCT/JP2016/072002, filed Jul. 27, 2016.

TECHNICAL FIELD

The present invention relates to a mass spectrometer, and more specifically, to a mass spectrometer that is preferable for an orthogonal acceleration type time-of-flight mass spectrometer that repeatedly obtains in a periodic manner an ion intensity signal over a predetermined mass-to-charge-ratio range with respect to a sample continuously introduced.

BACKGROUND ART

In normal types of time-of-flight mass spectrometers (this device is hereinafter referred to as the "TOFMS"), a preset amount of kinetic energy is imparted to ions derived from a sample component to make those ions fly a preset distance in a flight space. The period of time required for their flight is measured, and the mass-to-charge ratio of each ion is calculated from its time of flight. Therefore, if there is a variation in the position of the ions or in the amount of initial energy of the ions at the time when the ions are accelerated and begin to fly, a variation in the time of flight of the ions having the same mass-to-charge ratio occurs, which leads to a deterioration in the mass-resolving power or mass accuracy. As a technique for solving such a problem, an orthogonal acceleration type time-of-flight mass spectrometer, which accelerates ions into the flight space in a direction orthogonal to the incident direction of the ion beam, has been commonly known (hereinafter referred to as the "OA-TOFMS").

As just described, the OA-TOFMS is configured to accelerate ions in a pulsed fashion in the direction orthogonal to the direction in which a beam of ions derived from a sample component is initially introduced. Such a configuration allows the device to be combined with various types of ion sources which ionize components contained in a continuously introduced sample, such as an atmospheric pressure ion source (e.g. electrospray ion source) or electron ionization source. In recent years, the so-called "Q-TOF mass spectrometer" has also been widely used for structural analyses of compounds or similar purposes. In this device, the OA-TOFMS is combined with a quadrupole mass filter for selecting ions having specific mass-to-charge ratios from ions derived from a sample component as well as a collision cell for dissociating the selected ion by collision-induced dissociation (CID). For example, Non Patent Literature 1 discloses a liquid chromatograph mass spectrometer (hereinafter referred to as the "LC-MS") for which a Q-TOF mass spectrometer is used as a detector.

The Q-TOF mass spectrometer described above is not only capable of performing an MS/MS analysis but also capable of repeatedly performing a normal mass analysis which does not involve a dissociation operation of ion in a collision cell with high mass resolution. In this case, it is common that a quadrupole mass filter in a previous stage is controlled to function as a type of ion guide that simply transports ions to a latter stage while converging them without performing mass separation to the ions and that the ions are let almost pass through the collision cell without collision-induced dissociation being performed.

In an LC-MS, eluate that contains different components is sequentially introduced into an ion source of the mass spectrometer with the elapse of time. Accordingly, in an LC-MS using a Q-TOF mass spectrometer, ions are repeatedly ejected from the orthogonal accelerator with a predetermined measurement period, and a time-of-flight spectrum with respect to the ejected ions is obtained in the Q-TOF mass spectrometer. In this case, when the measurement period is increased, the measurement time intervals in the Q-TOF mass spectrometer should increase, and there arises a problem that the reproducibility of a peak shape deteriorates when a chromatogram is created based on obtained data, and the quantitative accuracy lowers because the quantitative determination is based on the peak area and the like. For this reason, it is preferable to shorten the measurement period in order to improve the quantitative accuracy.

However, when a normal mass spectrometry is performed with a short measurement period in the Q-TOF mass spectrometer, there is a problem that ions of the next measurement period are ejected from the orthogonal accelerator to the flight space while ions with a long time of flight (that is, ions having large mass-to-charge ratios) are still in the flight space, and thus ions having small mass-to-charge ratios in the next measurement period may catch up with or pass the ions having large mass-to-charge ratios in the previous measurement period, and they may be mixed when reaching the detector.

FIG. 7 at (a) presents an example of time-of-flight spectrum when the measurement period is 200 [μsec] and FIG. 7 at (b) presents the same when the measurement period is 100 [μsec], which is half of it. FIG. 8 at (a) and (b) are enlarged figures of the frame E on the time-of-flight spectrum presented in FIG. 7 at (a) and (b). Most of the peaks observed in the time range of 0 to 15 [μsec] on the time-of-flight spectrum with the measurement period of 100 [μsec] are peaks derived from ions having large mass-to-charge ratios observed in the time range of 100 to 115 [μsec] on the time-of-flight spectrum if the measurement period is taken sufficiently long. Thus, there has been a problem that when the measurement period is shortened, target ions in the previous measurement period appear at positions different from the original positions on the time-of-flight spectrum, which hampers obtaining accurate time-of-flight spectrum.

Patent Literature 1 discloses a technique to find a peak derived from ions in a previous measurement period by comparing a mass spectrum obtained under a different measurement period. Owing to this technique, a peak derived from ions having large mass-to-charge ratios in the previous measurement period can be removed from a time-of-flight spectrum that includes such ions, and enables creating a time-of-flight spectrum on which only a peak derived from the original ions is observed. However, it requires complicated data processing and, further, it is necessary to perform the mass spectrometry twice under different measurement periods to the same sample, and thus it takes time and labor for the measurement.

CITATION LIST

Patent Literature

Patent Literature 1: U.S. Pat. No. 8,410,430 B2

NON PATENT LITERATURE

Non Patent Literature 1: Agilent 6500 Series Q-TOF LC/MS System, [online], Agilent Technologies, [searched on Jun. 21, 2016], Internet

SUMMARY OF INVENTION

Technical Problem

The present invention has been developed to solve the previously described problem. Its main objective is to provide a mass spectrometer that is capable of obtaining an accurate mass spectrum by preventing ions having large mass-to-charge ratios generated in the previous measurement period from being observed on a mass spectrum even if the measurement period is short when mass spectrometry is repeatedly performed in a predetermined measurement period.

Solution to Problem

According to a first aspect of the present invention made for solving the previously described problem, a mass spectrometer includes: an ion source for ionizing a sample component; and a time-of-flight mass spectrometry unit that includes a flight space in which ions fly, an ejection unit that gives a predetermined energy to ions generated in the ion source or ions derived from the ions and ejects the ions towards the flight space, and a detector for detecting ions having flown in the flight space, wherein: mass spectrometry is repeatedly performed in a predetermined measurement period in the time-of-flight mass spectrometry unit, the mass spectrometer comprising:

a) an ion transport unit that includes a multipole electrode provided between the ion source and the ejection unit, and b) a voltage generator configured to apply, to the multipole electrode, a voltage obtained by adding a radio-frequency voltage and a direct current voltage, and to apply, to the multipole electrode, a voltage for forming a multipole electrical field in which ions within a range of equal to or larger than a predetermined mass-to-charge ratio with which the time of flight in the flight space exceeds at least the predetermined measurement period when ions pass through a space surrounded by the multipole electrodes.

In the mass spectrometer of the first aspect according to the present invention, the ion transport unit is, for example, a quadrupole mass filter in a Q-TOF mass spectrometer.

That is to say, the mass spectrometer of the first aspect according to the present invention further includes a quadrupole mass filter selectively allowing an ion having a specific mass-to-charge ratio to pass through, and a collision cell used for dissociating an ion provided between the quadrupole mass filter and the ejection unit, where the quadrupole mass filter is used as the ion transport unit.

The mass spectrometer of the first aspect according to the present invention may further include an ion guide for converging ions by an effect of a radio-frequency electric field and sending them to a latter stage, where the ion guide may be used as the ion transport unit.

For instance, in case where a quadrupole mass filter selectively allows an ion having a specific mass-to-charge ratio to pass through, a voltage obtained by adding a direct current voltage and a radio-frequency voltage having a predetermined relationship is applied to an electrode (quadrupole electrode) forming a quadrupole mass filter. In this case, since it is normally preferable to select an ion with a high mass resolution, a direct current voltage and a radio-frequency voltage having a predetermined relationship are applied to the quadrupole electrode in such a manner that both an ion having an equal to or smaller than mass-to-charge ratio that is slightly smaller than the mass-to-charge ratio of an ion intended to pass through, and an ion having an equal to or larger than mass-to-charge ratio that is slightly larger than the mass-to-charge ratio of an ion intended to pass through diffuse (in other words, not pass through).

In view of such a problem, in the mass spectrometer of the first aspect according to the present invention, a voltage generator applies, to the multipole electrode, a direct current voltage and a radio-frequency voltage having a predetermined relationship, for forming a multipole electrical field in which ions within a range of equal to or greater than a predetermined mass-to-charge ratio in which the time of flight in the time-of-flight mass spectrometry unit exceeds at least a measurement period diffuse. In other words, the condition of the voltage to be applied to the multipole electrode is that, as described above, all the ions having relatively small mass-to-charge ratios other than ions intended to diffuse are allowed to pass through. However, when a voltage obtained by adding a radio-frequency voltage and a direct current voltage is applied to the multipole electrode, a cut-off point is necessarily generated also in the small mass-to-charge ratio, and thus ions having mass-to-charge ratios equal to or smaller than the cut-off point are also blocked in the multipole electrode. As a result, all the ions within the predetermined mass-to-charge-ratio range pass through the ion transport unit and the mass spectrometry is performed in the time-of-flight mass spectrometry unit.

In the mass spectrometer of the first aspect according to the present invention, a heavy ion that is caught up with by a high-speed, light ion ejected in the next measurement period during flight in the time-of-flight mass spectrometry unit is blocked from passing through in the ion transport unit. For this reason, such a heavy ion is originally not included in an ion packet ejected from the ejection unit of the time-of-flight mass spectrometry unit to the flight space. As a result, on a time-of-flight spectrum created based on a detection signal by an ion reaching the detector within one measurement period, a peak derived from an ion having a large mass-to-charge ratio in which the time of flight exceeds the one measurement period does not appear. This enables an accurate mass spectrum to be obtained without being affected by an ion having a large mass-to-charge ratio generated in the previous measurement period.

The condition of voltage at which an ion stably passes through an inner space of a quadrupole mass filter is known as a Mathieu equation, and expressed by a stability region having an approximately triangular shape on a Mathieu diagram adopting "q" value for the horizontal axis and "a" value for the vertical axis that are parameters based on the Mathieu equation. When an ion having a specific mass-to-charge ratio is selected with a quadrupole mass filter, the inclination of a mass scanning line is set in such a manner that the ion passes through a narrow range within the stability region near the top of a stability region having an approximately triangular shape. When the mass-to-charge ratio of an ion that should be selected is scanned (changed), a radio-frequency voltage and a direct current voltage are respectively changed with the inclination of the mass scanning line just as they are, in other words, with the relationship between them being kept constant. In a mass spectrometer according to the present invention, on the other hand, the mass scanning line is set in such a manner that the inclination becomes as small as nearly horizontal near the base far from the top of the stability region having an approximately triangular shape. This causes the mass scanning line to pass through a long region in the stability region. As a result, an ion having a wide mass-to-charge-ratio range stably passes through the quadrupole mass filter.

As described above, at the time of a normal mass separation and precursor ion selection in the quadrupole mass filter, the inclination of the mass scanning line is always constant, and the radio-frequency voltage and the direct current voltage are each changed in accordance with the target mass-to-charge ratio. Accordingly, if the control is similar also in the mass spectrometer of the first aspect according to the present invention, a typical circuit in a conventional Q-TOF mass spectrometer can be directly used as a configuration of a voltage generator that applies voltage to an ion transport unit that is a quadrupole mass filter, for example, and a control circuit that controls the voltage generator.

That is to say, as an embodiment of the mass spectrometer of the first aspect according to the present invention, the mass spectrometer may further include a control unit for controlling the voltage generator in such a manner that the inclination of the mass scanning line set so as to pass through the origin and pass through the stability region on a Mathieu diagram where the “q” value and the “a” value, which are parameters based on a Mathieu equation, are adopted for the two axes is made constant regardless of the mass-to-charge-ratio range of the measurement target and that a constant direct current voltage and a constant radio-frequency voltage in accordance with the mass-to-charge-ratio range of the measurement target are applied to the multipole electrode.

However, in the above configuration, the mass-to-charge-ratio range of the measurement target becomes narrow because the upper limit of the mass-to-charge-ratio range rapidly decreases with the range of the measurement target is lowered. Accordingly, in order to keep the upper limit of the mass-to-charge-ratio range of the measurement target as much as possible while its lower limit is reduced as much as possible, the inclination of the mass scanning line that has been set so as to pass through the stability region on a Mathieu diagram should not be made constant and should be changed in accordance with the mass-to-charge-ratio range of the measurement target.

That is to say, the mass spectrometer of the first aspect according to the present invention may further include a control unit for controlling the voltage generator in such a manner that the inclination of the mass scanning line set so as to pass through the origin and pass through the stability region on a Mathieu diagram where the “q” value and the “a” value, which are parameters based on a Mathieu equation, are adopted for the two axes is changed in accordance with mass scanning over the mass-to-charge-ratio range of the measurement target and that a direct current voltage and a radio-frequency voltage changing in response to a change in the inclination of the mass scanning line in accordance with the mass scanning within the mass-to-charge-ratio range of the measurement target are applied to the multipole electrode.

When it is desired to perform a mass spectrometry for a wide mass-to-charge-ratio range, this configuration makes it possible to improve measurement efficiency by eliminating the need for an effort to divide the mass-to-charge-ratio range of the measurement target and perform a mass spectrometry for each of the mass-to-charge-ratio ranges of the measurement target that are different from one another.

It is preferable that in case where the mass spectrometer of the first aspect according to the present invention includes a collision cell, a quadrupole mass filter, an ion guide, and the like that are arranged in a previous stage of the collision cell are used as the ion transport unit.

At the time of MS/MS spectrometry, collision gas is introduced into the collision cell. Even when dissociation of an ion is not performed, if the collision gas has been introduced into the collision cell, the ion introduced into the collision cell contacts the gas and is cooled (dissociation does not occur here because the energy imparted to the ion introduced into the collision cell is small). Once the ion is cooled, differences in the energy and the degree of acceleration that imparted to the ions so far in the ion guide, the quadrupole mass filter, and so on are resolved. Due to this, mass spectrometry in the time-of-flight mass spectrometry unit is not affected by the difference in electrical field in accordance with the mass-to-charge ratio when an ion passes through the ion transport unit mentioned above and the like. Thus, it is advantageous in achieving high mass accuracy and mass resolution.

According to a second aspect of the present invention made for solving the previously described problem, a mass spectrometer includes: an ion source for ionizing a sample component; a quadrupole mass filter capable of selecting an ion having a specific mass-to-charge ratio among ions generated in the ion source; a collision cell for dissociating the ion selected in the quadrupole mass filter; and a time-of-flight mass spectrometry unit that includes a flight space in which ions fly, an ejection unit that gives a predetermined energy to ions generated in the ion source or ions generated by ion dissociation in the collision cell and ejects the ions towards the flight space, and a detector for detecting ions having flown in the flight space, the mass spectrometer comprising:

a) a voltage generator that applies, to each electrode of the quadrupole mass filter, a voltage obtained by adding a radio-frequency voltage and a direct current voltage; and b) a control unit for controlling the voltage generator in such a manner that an inclination of a mass scanning line that is a straight line passing through an origin on a Mathieu diagram where a “q” value and an “a” value, which are parameters based on a Mathieu equation, are adopted for two axes is adjustable within a predetermined range between a horizontal state where a=0 and a predetermined inclination state where the mass scanning line passes through a base of a stability region.

As described above, when an ion having a specific mass-to-charge ratio is selected with a quadrupole mass filter of a general Q-TOF mass spectrometer, the inclination of a mass scanning line is set in such a manner that the ion passes through a narrow range within the stability region near the top of a stability region having an approximately triangular shape. For this reason, fine adjustment of the inclination of the mass scanning line may be possible. However, it is adjustment within a fine range about the mass scanning line set so as to pass through a predetermined range (normally, a range depending on a target mass separation capability) near the top of the stability region.

On the other hand, according to the mass spectrometer of the second aspect of the present invention, the inclination of the mass scanning line is made adjustable within a predetermined range between a horizontal state along the base of the stability region having an approximately triangular shape and a predetermined inclination state passing through the base of the stability region (for instance, an inclination state in such a manner that the mass scanning line crosses on the lower side from the midpoint of the boundary line on the right side of the stability region having an approximately triangular shape). As a matter of course, even if the inclination of the mass scanning line is adjusted within this range, a high mass separation capability and a high mass selection capability are not obtained, which is therefore not useable for a normal precursor ion selection. However, it is useful when causing ions over a wide range of mass-to-charge ratios to pass through and blocking ions having large mass-to-charge ratios equal to or more than the upper limit of the mass-to-charge-ratio range from passing through, and the upper limit of the mass-to-charge-ratio range in which the ions are caused to pass through can be appropriately adjusted by inclination of the mass scanning line.

The mass spectrometer according to the second mode of the present invention selectably includes, as operation modes of the quadrupole mass filter:

a first mode in which the inclination of the mass scanning line is set such that, on the Mathieu diagram, the mass scanning line passes through a predetermined range near a top of a stability region; and a second mode in which, on the Mathieu diagram, the inclination of the mass scanning line is adjustable within a predetermined range between a horizontal state and the predetermined inclination state, wherein the control unit controls the voltage generator in accordance with the mass scanning line of a designated inclination when the second mode is selected.

In this configuration, when precursor ion selection is performed with the quadrupole mass filter in order to perform an MS/MS spectrometry, the first mode should be selected as an operation mode of the quadrupole mass filter, and when a normal mass spectrometry is performed without dissociating an ion in a collision cell, the second mode should be selected as an operation mode of the quadrupole mass filter. This allows a good mass spectrum to be created even if the measurement period is short in a normal mass spectrometry while easily switching between the MS/MS spectrometry and the normal mass spectrometry.

Advantageous Effects of Invention

According to a mass spectrometer according to the present invention, when a mass spectrometry is repeatedly performed within a predetermined measurement period, even if the measurement period is short, it is possible to obtain an accurate mass spectrum free from the influence of ions having large mass-to-charge ratios generated in the previous measurement period. An increase in the cost can be suppressed because unnecessary ions having large mass-to-charge ratios are removed using the quadrupole mass filter, the ion guide, and other structural elements included in advance in the Q-TOF mass spectrometer and the like. In addition, in general, rod electrodes forming a quadrupole mass filter have a very high dimensional accuracy. Hence, if the quadrupole mass filter is used for ion removal in the present invention, undesired ions can be removed with a large mass-to-charge ratio accuracy.

DESCRIPTION OF EMBODIMENTS

First Embodiment

A Q-TOF mass spectrometer as the first embodiment of the present invention is hereinafter described with reference to the attached drawings.

Figure 1:
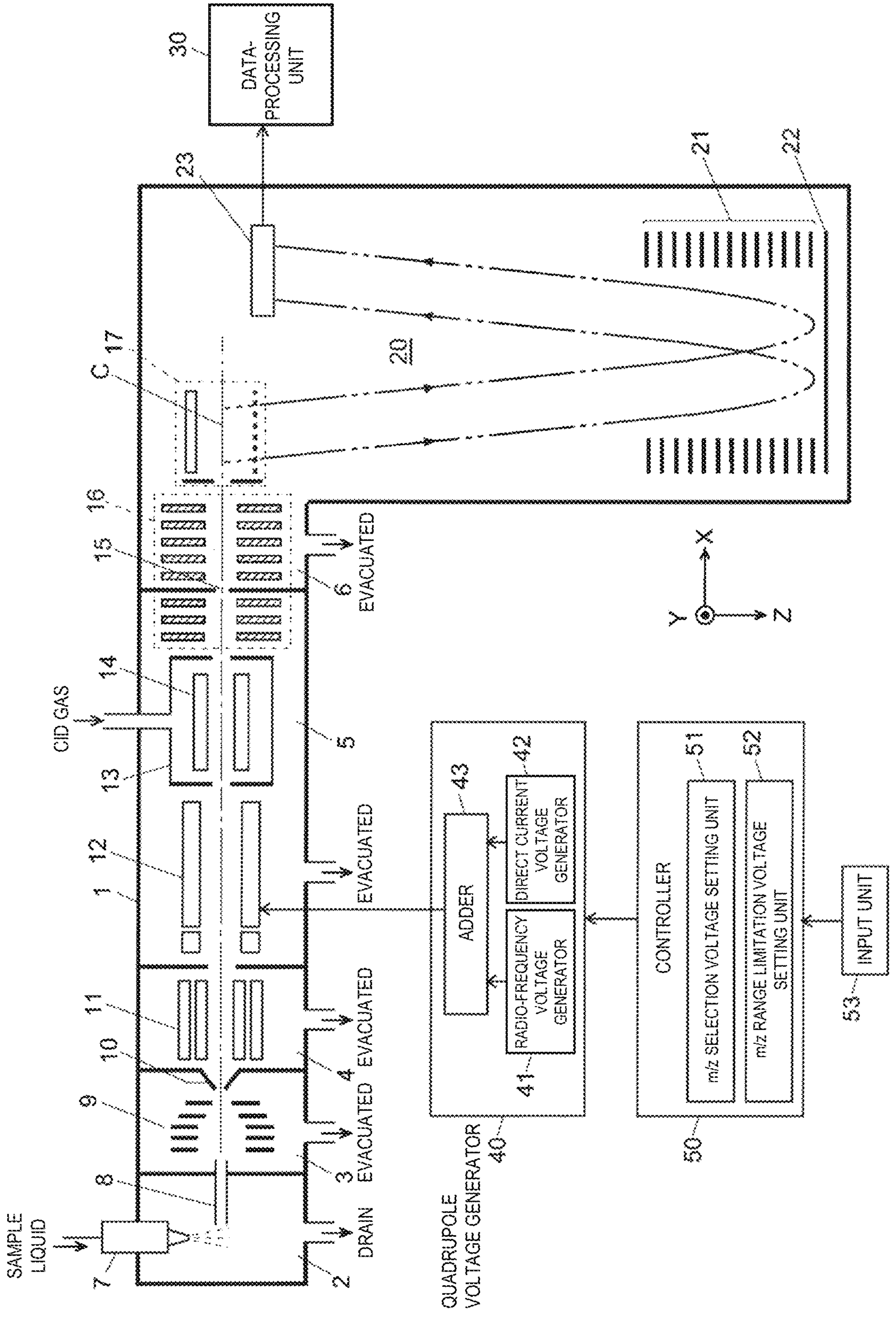
FIG. 1 is a schematic configuration diagram of a Q-TOF mass spectrometer as the first embodiment of the present invention.

FIG. 1 is an overall configuration diagram of the Q-TOF mass spectrometer according to the first embodiment.

The Q-TOF mass spectrometer in the present embodiment has the configuration of a multistage pumping system, including an ionization chamber 2 maintained at substantially atmospheric pressure and a high vacuum chamber 6 with the highest degree of vacuum, with three (first through third) intermediate vacuum chambers 3, 4 and 5 between the two aforementioned chambers 2 and 6 located within a chamber 1.

The ionization chamber 2 is equipped with an ESI spray 7 for electrospray ionization (ESI). When a sample liquid containing a target compound is supplied to the ESI spray 7, ions originating from the target compound are generated from liquid droplets imparted with uneven charge at the tip of the spray 7 and sprayed. It should be noted that the ionization method is not limited to this example.

The various kinds of generated ions are sent through a heated capillary 8 into the first intermediate vacuum chamber 3, where the ions are converged by an ion guide 9 and sent through a skimmer 10 into the second intermediate vacuum chamber 4. The ions are further converged by a multipole ion guide 11 and sent into the third intermediate vacuum chamber 5. The third intermediate vacuum chamber 5 contains a quadrupole mass filter 12 and a collision cell 13, with a multipole ion guide 14 contained in the collision cell 13. The various ions derived from the sample are introduced into the quadrupole mass filter 12. At the time of MS/MS spectrometry, only an ion having a specific mass-to-charge ratio corresponding to the voltage applied to the quadrupole mass filter 12 is allowed to pass through the quadrupole mass filter 12. This ion is introduced into the collision cell 13 as the precursor ion. Due to the contact with the collision gas supplied from an external source into the collision cell 13, the precursor ion undergoes dissociation, generating various product ions.

The generated product ions exit from the collision cell 13. After that, being guided by the ion transport optical system 16, those ions pass through an ion passage hole 15 and are introduced into the high vacuum chamber 6. The high vacuum chamber 6 contains: an orthogonal accelerator 17 that is an ion ejection source; a flight space 20 including a reflector 21 and a back plate 22; and an ion detector 23. Ions introduced into the orthogonal accelerator 17 in the X-axis direction begin to fly by being accelerated in the Z-axis direction at a predetermined timing. The ions initially fly freely and are subsequently returned by the reflecting electric field formed by the reflector 21 and the back plate 22. After flying once more freely, the ions reach the ion detector 23. The time of flight required for an ion to reach the ion detector 23 after its departure from the orthogonal accelerator 17 depends on the mass-to-charge ratio of the ion. Receiving a detection signal by the ion detector 23, a data-processing unit 30 creates a time-of-flight spectrum and calculates a mass spectrum by converting the time of flight into a mass-to-charge ratio.

The quadrupole mass filter 12 includes four rod electrodes arranged in such positions as to be parallel to one another in such a manner as to surround an ion beam axis C. A quadrupole voltage generator 40, which applies voltage to each of those rod electrodes, includes a radio-frequency voltage generator 41, a direct current voltage generator 42, and an adder 43. A control unit 50, to which an input unit 53 to be operated by a user is connected, includes an m/z selection voltage setting unit 51 and an m/z range limitation voltage setting unit 52 as a function block. It should be noted that other than the quadrupole voltage generator 40, components for applying voltage to each unit are not shown.

While the Q-TOF mass spectrometer of the present embodiment is capable of performing MS/MS spectrometry by dissociating an ion in the collision cell 13, it is also capable of performing a normal mass spectrometry without dissociating an ion in the collision cell 13. The Q-TOF mass spectrometer of the present embodiment performs control characteristic when performing a normal mass spectrometry that does not involve such an ion dissociation operation. The characteristic operation is hereinafter described in detail with reference to FIG. 2 to FIG. 4.

Firstly, an operation to be performed when an ion having a specific mass-to-charge ratio is allowed to selectively pass through the quadrupole mass filter 12 is explained simply.

As known well, in the quadrupole mass filter, a voltage U+V cos ωt, which is obtained by adding a direct current voltage U and a radio-frequency voltage V cos ωt, is applied to two rod electrodes opposite to each other across the ion beam axis C, and a voltage-U-V cos ωt having polarities different from each other is applied to another two rod electrodes neighboring those two rod electrodes in the circumferential direction. Provided that a voltage value U of the direct current voltage and an amplitude value V of the radio-frequency voltage have a predetermined relationship, an ion having a specific mass-to-charge ratio in accordance with it moves near the ion beam axis C and passes through a space surrounded by the rod electrodes while vibrating. Conditions such as voltage at which an ion stably passes through an inner space of a quadrupole mass filter are known as a Mathieu equation, which are often expressed by a stability region on a Mathieu diagram presented in FIG. 2.

Figure 2:
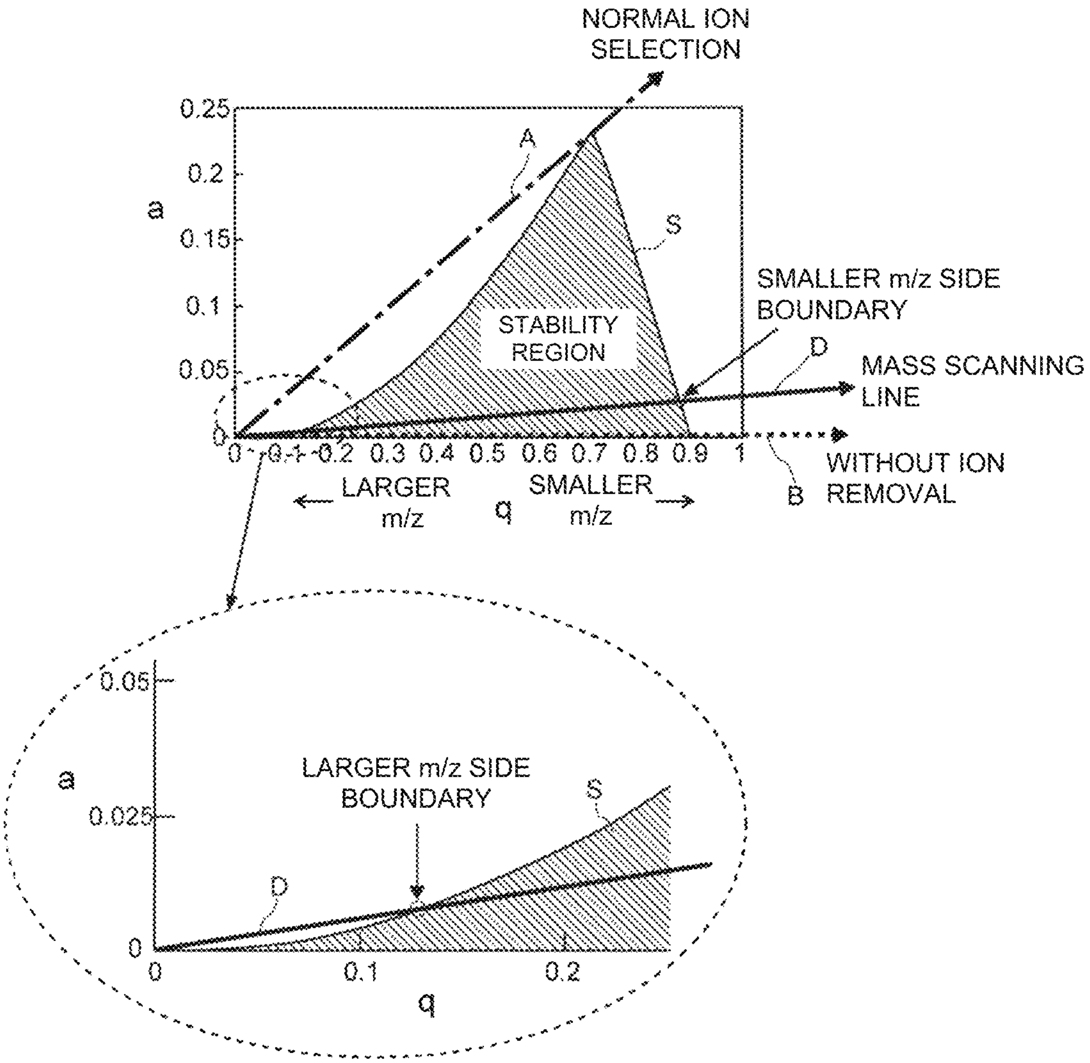
FIG. 2 is an illustration diagram of an operation of the quadrupole mass filter in a Q-TOF mass spectrometer according to the first embodiment.

The parameters a and q of the horizontal axis and the vertical axis of the Mathieu diagram presented in FIG. 2 are defined by the following expressions.

$$a=(8\ \mathrm{eU})/(mr_0^2\omega^2)$$

$$q=(4\ \mathrm{eV})/(mr_0^2\omega^2)$$

Here, "e" is the charge of an ion, "m" is the mass of an ion, and "$r_0$" is the shortest distance (the radius of the inscribed circle of the rod electrode) from the central axis (ion beam axis C) to the rod electrode periphery. That is to say, "a" is proportional to the voltage value U of direct current voltage and "q" is proportional to the amplitude value V of radio-frequency voltage. The region having an approximately triangular shape shown with hatched lines in FIG. 2 is a stability region S where the ion follows a stable orbit (does not diffuse).

When it is desired that in a quadrupole mass filter an ion having a specific mass-to-charge ratio is selected with a high mass separation capability such as a precursor ion selection, U and V are determined in such a manner that the relationship between the parameters a and q is along a mass scanning line A represented by the alternate long and short dash line in FIG. 2 for instance. In this case, the stability region S and the mass scanning line A overlap in a very narrow range near the top of the stability region S. For this reason, only the target mass-to-charge ratio M1 enters the stability region S, and a mass-to-charge ratio that is greater or smaller than the target mass-to-charge ratio M1 falls out of the stability region S. This enables to select only an ion having the target mass-to-charge ratio M1 with a high separation capability. In other words, in a precursor ion selection for MS/MS spectrometry, in order to select the precursor ion with a high separation capability, a mass scanning line having the travel path presented by A in FIG. 2 is set. Since the length of which the mass scanning line passes through the stability region S corresponds to the mass separation capability, as the mass separation capability at the time of ion selection is adjustable, the inclination of the mass scanning line is adjustable in a narrow range near the top of the stability region S where the mass scanning line passes through. The mass separation capability of the quadrupole mass filter 12 when mass scanning is conducted in the travel path of the mass scanning line A presented in FIG. 2 preferably has a peak half-value width on the mass spectrum related to the quadrupole mass filter 12, for instance, of 5 u or less, more preferably 3 u or less, yet more preferably 1 u, yet further more preferably 0.7 u or less (however, here, the unit u means the unified atomic mass unit).

On the other hand, when a typical Q-TOF mass spectrometer conducts a normal mass spectrometry, an ion selection is not performed in the quadrupole mass filter, therefore only the radio-frequency voltage V cos ωt is applied to each rod electrode. By the radio-frequency electrical field formed by this, all the ions move while vibrating, pass through the quadrupole mass filter, and are transported to the latter stage (collision cell). In this case, since U=0, a=0, and the mass scanning line at that time is along the horizontal axis (q axis) as presented by the dotted line B in FIG. 2, or, is along the base of the stability region S. In this case, the mass-to-charge ratio corresponding to the bottom right end point of the stability region S through which the mass scanning line B passes is a cut-off point on the smaller m/z side. On the other hand, since the bottom left end point of the stability region S is almost coincident with the origin, a cut-off point on the larger m/z side does not exist theoretically. For this reason, while ions equal to or less than the cut-off point on the smaller m/z side diffuse when they pass through the quadrupole mass filter and are removed, ions on the larger m/z side are not removed theoretically, almost all of the ions pass through. For this reason, when the OA-TOFMS of the latter stage is operated at a constant measurement period, ions having large mass-to-charge ratios where the time of flight does not fall within the measurement period are also sent to the orthogonal accelerator.

On the other hand, in a Q-TOF mass spectrometer of the present embodiment, by not only applying a radio-frequency voltage to each rod electrode of the quadrupole mass filter 12 at the time of a normal mass spectrometry but also applying an appropriate direct current voltage U, an ion on the larger m/z side of equal to or more than a predetermined mass-to-charge ratio is blocked, which avoiding such an ion from being introduced into the orthogonal accelerator 17. The principle of blocking of the ion on the larger m/z side is described.

When the radio-frequency voltage V cos ωt is applied to each rod electrode of the quadrupole mass filter 12, in addition to it, the direct current voltage U that has a predetermined relationship with the amplitude value V of the radio-frequency voltage and that is very small compared at the time of a normal mass spectrometry is applied, the mass scanning line becomes a straight line slightly rising diagonally up and to the right as presented by the solid line D in FIG. 2. Since the slope of the boundary line on the larger m/z side of the stability region S is a curved line having a very gradual inclination near the origin, if the mass scanning line D is a moderate inclination rising diagonally up and to the right as described above, as presented in the enlarged figure at the bottom of FIG. 2, the mass scanning line D and the boundary line of the stability region S cross at a point that becomes a cut-off point on the larger m/z side. At this time, since in the mass scanning line D, the long range between the cut-off point on the larger m/z side and the cut-off point on the smaller m/z side falls within the stability region S, it is possible to regard this as a mass filter through which not an ion having a specific mass-to-charge ratio pass but all ions in the wide mass-to-charge-ratio range pass.

As an example, when the direct current voltage U is set in such a manner that the parameter a becomes about 0.07, with the quadrupole mass filter used by this applicant, the cut-off coefficient Max(m/z) on larger m/z side and the cut-off coefficient Min(m/z) on the smaller m/z side become as follows respectively. The cut-off coefficient mentioned here is a numeric value that represents how many times of range of mass-to-charge ratio falls within the stability region S on the larger m/z side and the smaller m/z side, respectively, with respect to the target mass-to-charge ratio set so as to fall under the stability region S, and the smaller this different is, the higher the mass separation capability of an ion is.

$$\mathrm{Max}(m/z)=0.706/0.21=3.36\text{ times}$$

$$\mathrm{Min}(m/z)=0.706/0.85=0.83\text{ times}$$

For this reason, when the mass-to-charge ratio m/z of the target ion that is desired to pass through the quadrupole mass filter 12 is set to be 1000, the mass-to-charge-ratio range of an ion that can pass through the quadrupole mass filter 12 becomes m/z 830 to 3360. In this manner, the parameter a is appropriately set in accordance with the mass-to-charge-ratio range of the ion that is desired to pass through the quadrupole mass filter 12, and the corresponding direct current voltage U should be obtained.

Use of the mass scanning line with the same inclination on a Mathieu diagram for any mass-to-charge ratio means that the parameters (a and q) are common for any mass-to-charge ratio. In such a case, the relationship between the mass-to-charge ratio m/z of the target ion and the mass-to-charge-ratio range of the ion that can actually pass through the quadrupole mass filter 12 can be obtained in the following manner.

Figure 3:
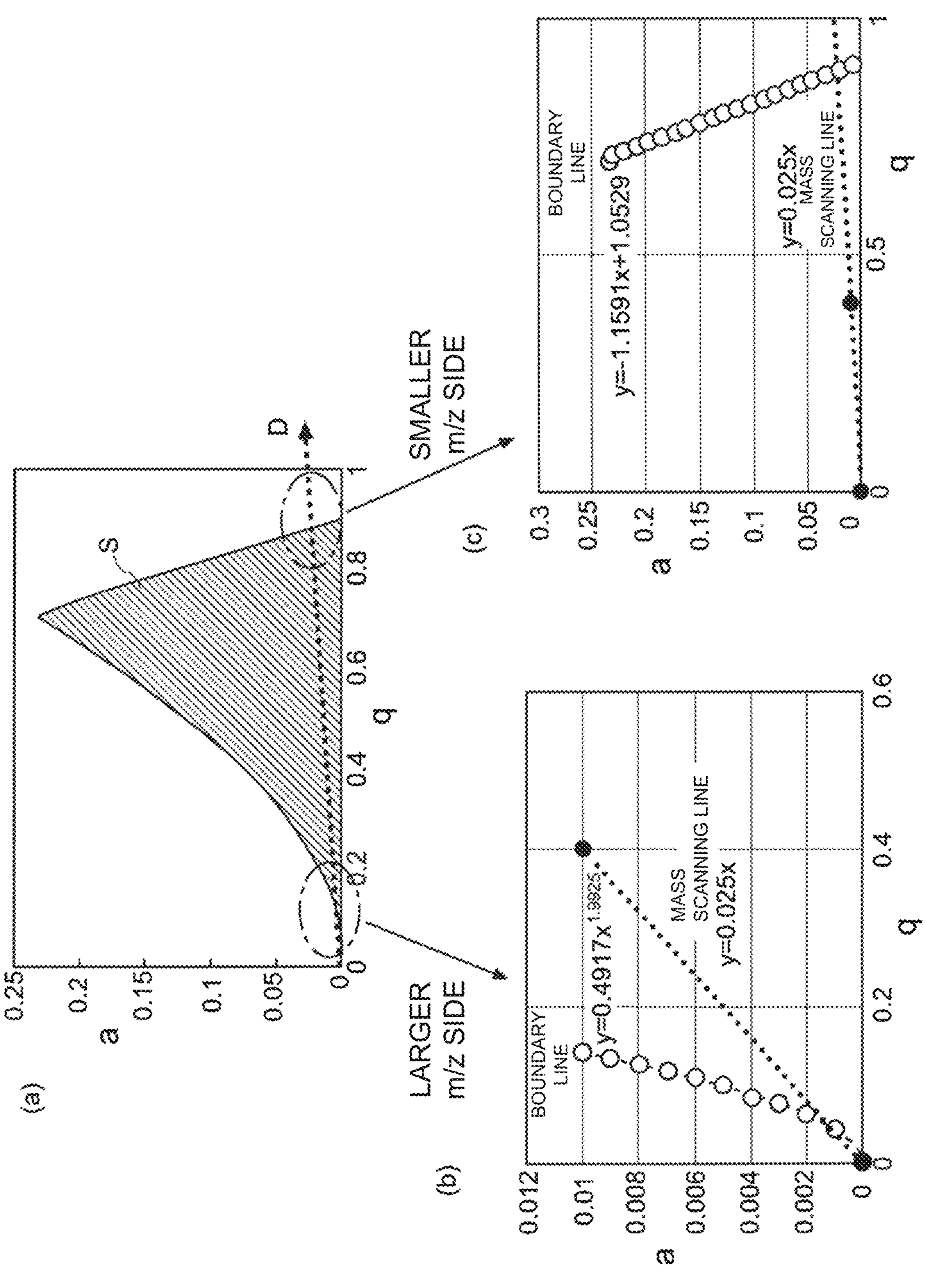
FIG. 3 is an illustration diagram of an operation of the quadrupole mass filter in a Q-TOF mass spectrometer according to the first embodiment.

First, as presented in FIG. 3 at (b) and (c), the boundary lines on the larger m/z side and on the smaller m/z side in the stability region S on the Mathieu diagram are each approximated in a mathematical expression. In this example, in the stability region S presented in FIG. 3, the boundary line of the larger m/z side can be expressed as $y=0.4917x^{1.9925}$, and the boundary line of the smaller m/z side can be expressed as $y=-1.1591x+1.0529$. Intersection points of the two boundary lines thus mathematically expressed and the mass scanning line that defines the parameters a and q (in this example, since a=0.01, q=0.4, y=0.25x in FIG. 3) are each obtained. Then, from those intersection points, the upper limit m/z value and the lower limit m/z value of the ion that can pass through the quadrupole mass filter 12 are obtained.

Figure 4:
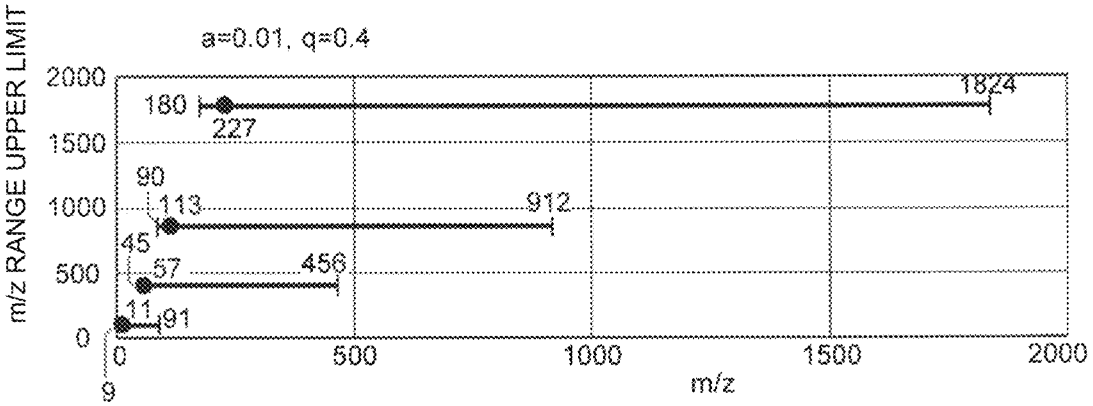
FIG. 4 is an illustration diagram of a measurable range of mass-to-charge ratios in a Q-TOF mass spectrometer according to the first embodiment.

The mass-to-charge-ratio ranges calculated when the m/z set values of the target ion are m/z 227, m/z 113, m/z 57, and m/z 11 are presented in FIG. 4. The mass-to-charge-ratio range that can be measured for instance when the m/z set value of the ion is m/z 227 becomes m/z 180 to 1824, and the mass-to-charge-ratio range that can be measured when the m/z set value of the ion is m/z 11 becomes m/z 9 to 91. In a case where the inclination of the mass scanning line, i.e., the parameters (a and q) is constant in this manner, the mass-to-charge-ratio range that can be measured greatly changes if the m/z set value of the target ion is changed. FIG. 4 indicates that the change in the mass-to-charge ratio of the cut-off point of the larger m/z side is greater than that of the cut-off point of the smaller m/z side. For this reason, when it is desired that the mass-to-charge-ratio range of the measurement target is enlarged to the small mass-to-charge ratio, the mass-to-charge-ratio range itself is rather narrow.

In a Q-TOF mass spectrometer of the present embodiment, separately from the parameters (a and q) corresponding to the mass scanning line A in FIG. 2 for example when a precursor ion selection is performed in the quadrupole mass filter 12, the parameters (a and q) corresponding to the mass scanning line D having a very gradual (close to horizontal) inclination compared to the mass scanning line A, used for a normal mass spectrometry are set in advance. The parameters (a and q) corresponding to the former mass scanning line A are stored in advance inside an m/z selection voltage setting unit 51 and the parameters (a and q) corresponding to the latter mass scanning line D are stored in advance inside an m/z range limitation voltage setting unit 52. However, since as described above, it is desirable that in a precursor ion selection and the like, the mass separation capability can be adjusted, in the m/z selection voltage setting unit 51, the inclination of the mass scanning line A determined by the set parameters (a and q) can be adjusted within an appropriate range. On the other hand, similarly in the m/z range limitation voltage setting unit 52, the inclination of the mass scanning line D determined by the set parameters (a and q) can be adjusted within an appropriate range. It should be noted that in this case, the range in which the mass scanning line becomes the horizontal state as presented by B in FIG. 2 should also be adjustable.

When the user instructs execution of normal mass spectrometry from the input unit 53, the mass-to-charge-ratio range and the measurement period desired to measure are instructed at the same time. However, since the shorter the measurement period is, the smaller the upper limit of the mass-to-charge-ratio range becomes, when the user first designates the measurement period, the upper limit value of the mass-to-charge-ratio range where measurement is possible in the designate measurement period is indicated, and the user should designate the mass-to-charge-ratio range of the measurement target in such a manner that the mass-to-charge-ratio range is equal to or less than the upper limit value.

The m/z range limitation voltage setting unit 52, as described above, based on the parameters (a and q) stored in advance (or, parameters corresponding to the mass scanning line for which an appropriately fine adjusted inclination of the mass scanning line determined accordingly) and the mass-to-charge-ratio range of the designated measurement target, the amplitude value V of the direct current voltage U and the radio-frequency voltage at which an ion falling within the mass-to-charge-ratio range of the measurement target is allowed to pass through and an ion falling out of the range is removed is calculated. Then, based on the calculation result, the radio-frequency voltage generator 41 and the direct current voltage generator 42 of the quadrupole voltage generator 40 are each controlled. In accordance with it, the radio-frequency voltage generator 41 and the direct current voltage generator 42 each generate a predetermined voltage, and those voltages are added in the adder 43 and applied to each rod electrode of the quadrupole mass filter 12. Due to this, among various ions originating from the sample component generated by electrostatically spraying the liquid sample from the ESI spray 7, ions having mass-to-charge ratios falling out of the mass-to-charge-ratio range of the measurement target diffuse when they pass through the quadrupole mass filter 12 and are annihilated or discharged to outside. On the other hand, ions having mass-to-charge ratios falling within the mass-to-charge-ratio range of the measurement target stably passé through a space in the quadrupole mass filter 12 and are introduced into the orthogonal accelerator 17 via the collision cell 13 and the ion transport optical system 16.

A pulsed acceleration voltage is applied from a voltage generator not shown in the figures to a push-out electrode and the like included in the orthogonal accelerator 17 at measurement period intervals. Ions introduced into the orthogonal accelerator 17 in the X-axis direction are simultaneously accelerated in the Z-axis direction by this acceleration voltage and sent to the flight space 20. Since ions having large mass-to-charge ratios with the time of flight exceeding the measurement period are not introduced into the orthogonal accelerator 17, during the period after the ions are simultaneously ejected from the orthogonal accelerator 17 towards the flight space 20 before the acceleration voltage is next applied to the orthogonal accelerator 17, all the ions ejected earlier reach the ion detector 23. For this reason, an ion to be analyzed in a certain measurement period is not detected in the next measurement period, the data-processing unit 30 is capable of creating for each measurement period, an excellent time-of-flight spectrum and furthermore a mass spectrum without being affected at all by ions ejected from the orthogonal accelerator 17 in another measurement period.

Second Embodiment

In the first embodiment described above, since the parameters (a and q) are always constant, control is easy. On the other hand, when the amplitude value V of the radio-frequency voltage applied to the quadrupole mass filter 12 is small, an ion having a mass-to-charge ratio that does not become period delay originally are also blocked, hence the measurable mass-to-charge-ratio range becomes narrow. This is as presented in FIG. 4. Accordingly, a Q-TOF mass spectrometer of the second embodiment employs a control method different from that of the first embodiment in order to avoid excessive ion blockage and broaden the mass-to-charge-ratio range of the measurement target as much as possible. Since the configuration of the Q-TOF mass spectrometer of the second embodiment is basically the same as that of the Q-TOF mass spectrometer of the first embodiment described above, FIG. 1 is used as a configuration diagram in the description below.

Figure 5:
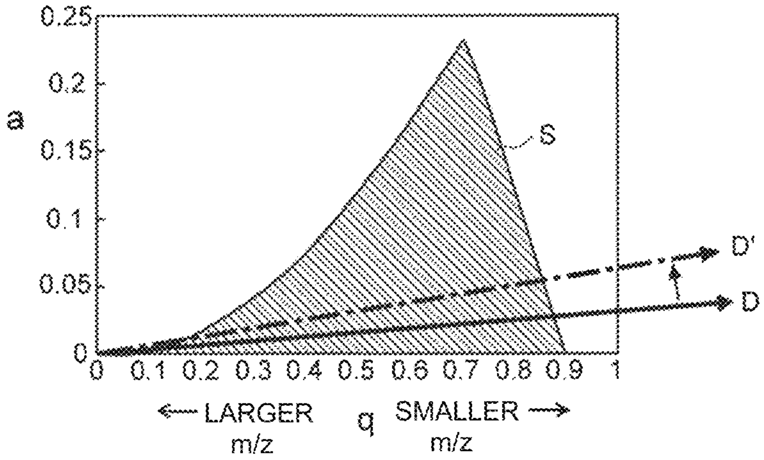
FIG. 5 is an illustration diagram of an operation of the quadrupole mass filter in a Q-TOF mass spectrometer as the second embodiment of the present invention.

FIG. 5 is a Mathieu diagram for illustrating an operation of the quadrupole mass filter 12 in a Q-TOF mass spectrometer as the second embodiment.

In a Q-TOF mass spectrometer of the first embodiment described above, the inclination of the mass scanning line on the Mathieu diagram is always constant, and the amplitude value V and direct current voltage U of the radio-frequency voltage are fixed in accordance with the mass-to-charge-ratio range of the measurement target. In contrast to it, in the Q-TOF mass spectrometer of the second embodiment, scanning is performed in such a manner that the amplitude value V of the radio-frequency voltage applied to the rod electrode of the quadrupole mass filter 12 is increased, the mass scanning line is moved in accordance with it in such a manner that the inclination thereof is gradually increased from D to D' for instance as presented in FIG. 5, and the direct current voltage U in accordance with the mass scanning line is applied to the rod electrode of the quadrupole mass filter 12. When the amplitude value V and the direct current voltage U of the radio-frequency voltage are scanned with the inclination of the mass scanning line being kept constant, the upper limit of the mass-to-charge-ratio range becomes too large with an increase of the amplitude value V of the radio-frequency voltage, however the upper limit of the mass-to-charge-ratio range can be suppressed by increasing the inclination of the mass scanning line.

Figure 6:
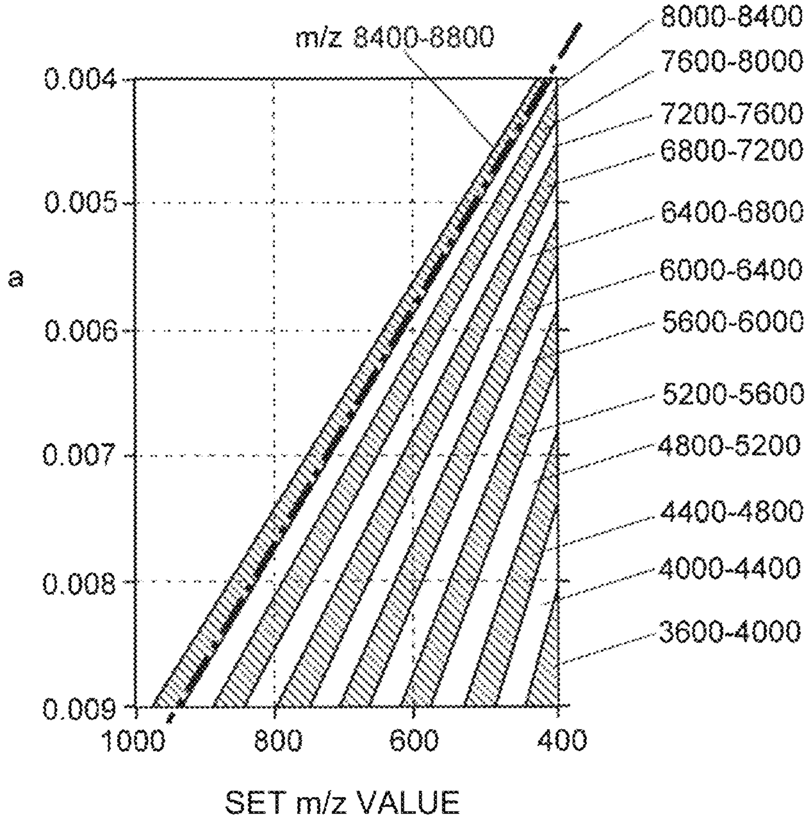
FIG. 6 is an illustration diagram of an operation of the quadrupole mass filter in a Q-TOF mass spectrometer as the second embodiment.
Figure 7:
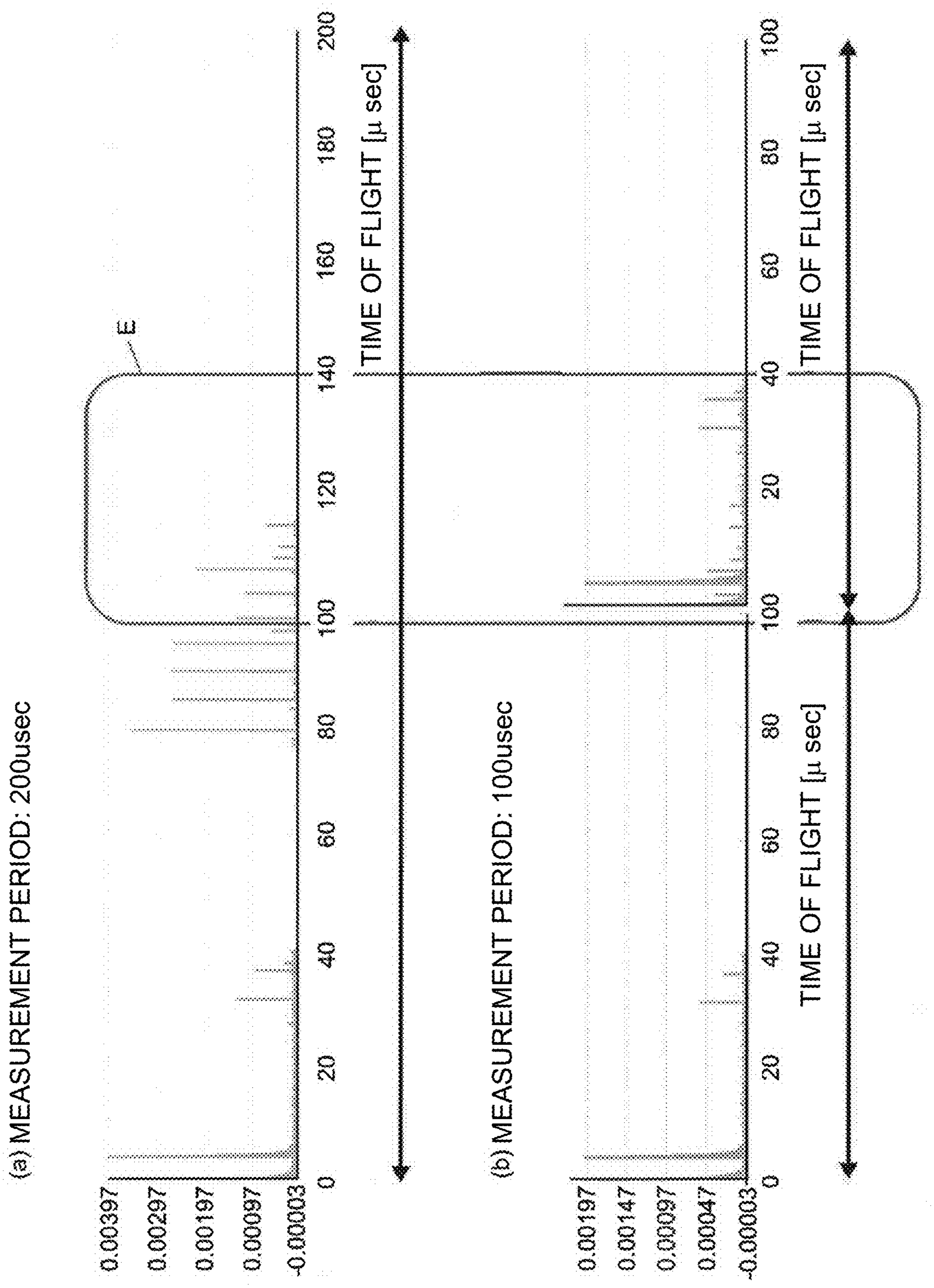
FIG. 7 is an illustration presenting a time-of-flight spectrum obtained when the measurement periods are 200 [μsec] and 100 [μsec] in a conventional Q-TOF mass spectrometer.
Figure 8:
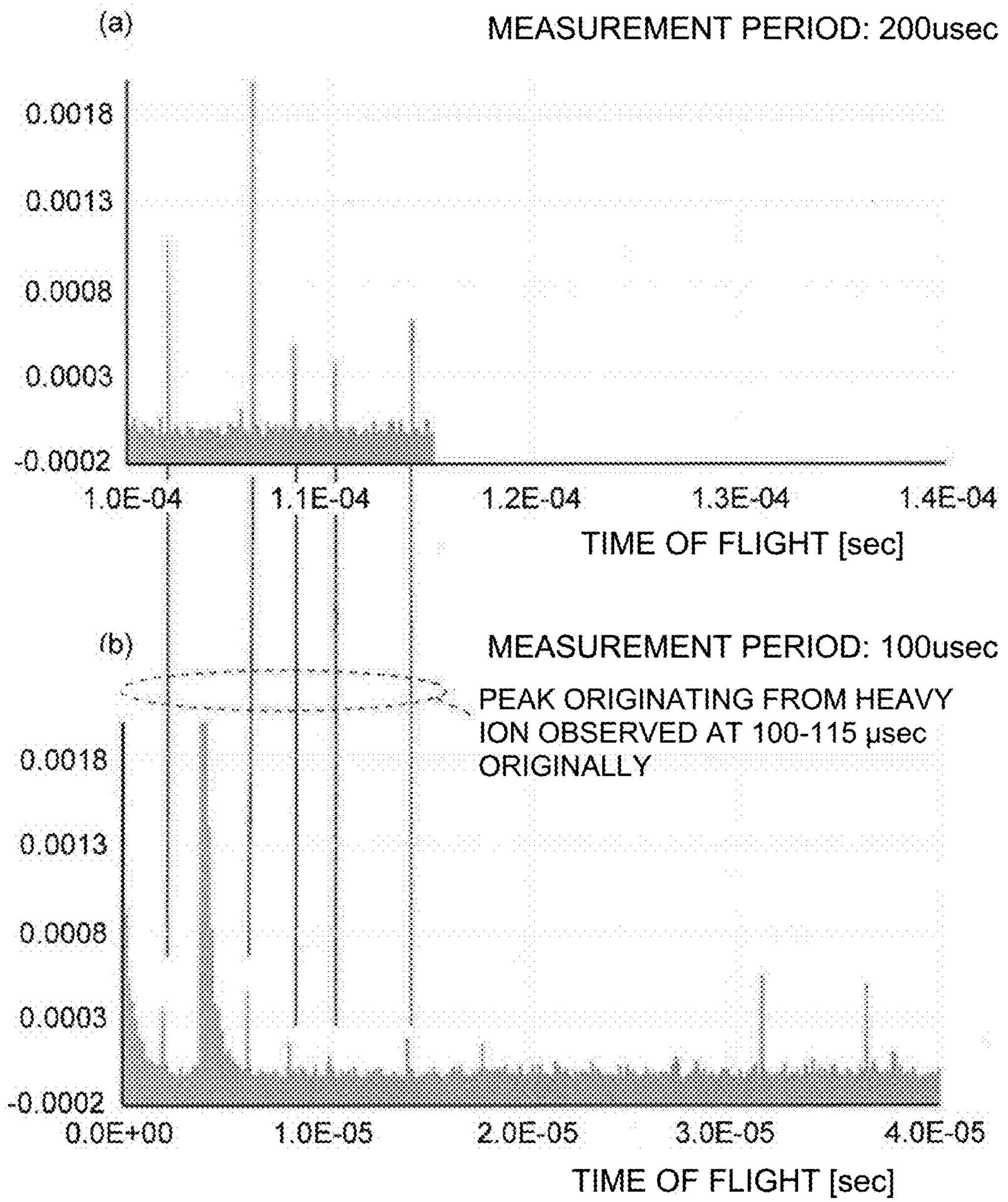
FIG. 8 is a partially enlarged illustration of the time-of-flight spectrum presented in FIG. 7.

FIG. 6 is a contour diagram presenting the mass-to-charge ratio of the larger m/z side upper limit of the mass-to-charge-ratio range in which an ion is allowed to pass through the quadrupole mass filter 12 when the mass-to-charge ratio of the ion is adopted for the horizontal axis and the "a" value is adopted for the vertical axis. Here, the mass-to-charge ratio value of the horizontal axis can be read as the amplitude value V of the radio-frequency voltage in accordance with the "q" value to be operated. In order to constantly maintain the upper limit of the mass-to-charge ratio of the ion allowed to pass through the quadrupole mass filter 12 in m/z 8400 to 8800, as presented by the alternate long and short dash line in FIG. 6, it is indicated that the "a" value, in other words, the direct current voltage U should be changed in accordance with the scan of the mass-to-charge ratio (in other words, the amplitude value V of the radio-frequency voltage).

It is necessary to scan (change) the direct current voltage U also at the time of scanning the amplitude value V of the radio-frequency voltage with the inclination of the mass scanning line being kept constant. However, in this case, the relationship between the amplitude value V and direct current voltage U is always constant. In contrast to it, here, the inclination of the mass scanning line is changed, therefore the change of the direct current voltage U when the amplitude value V of the radio-frequency voltage is scanned becomes different from that in a case where the inclination of the mass scanning line is constant. This is a control different from a typical mass scanning in a quadrupole mass filter for scanning measurement and the like, hence the control becomes complicated compared to a Q-TOF mass spectrometer of the first embodiment in that regard. However, it is possible to rather broaden the mass-to-charge-ratio range of the measurement target compared to the first embodiment while securely blocking ions having large mass-to-charge ratios where the time of flight exceeds the measurement period.

The Q-TOF mass spectrometer of the second embodiment stores in the m/z range limitation voltage setting unit 52 in advance information presenting the relationship between scanning of the mass-to-charge ratio (in other words, change in the amplitude value of the radio-frequency voltage) and the change in the mass scanning line or the relationship between scanning of the mass-to-charge ratio and the change in the direct current voltage, in association with the upper limit of the mass-to-charge-ratio range of the measurement target. Then, when the upper limit of the mass-to-charge-ratio range of the measurement target is determined by the user's designation, the m/z range limitation voltage setting unit 52 obtains information corresponding to it and controls the quadrupole voltage generator 40 so as to repeatedly scan the both the radio-frequency voltage and the direct current voltage to be applied to the rod electrode of the quadrupole mass filter 12 based on the information.

Similar to the first embodiment, this blocks in the quadrupole mass filter 12 ions having large mass-to-charge ratios where the time of flight exceeds the measurement period, and thus it is possible to create an excellent time-of-flight spectrum and moreover a mass spectrum. In addition, the Q-TOF mass spectrometer of the second embodiment is capable of introducing ions having mass-to-charge ratios where the time of flight does not exceed the measurement period into the orthogonal accelerator 17 without blocking them in the quadrupole mass filter 12, and thus it is possible to create a mass spectrum having a wide mass-to-charge-ratio range equal to or less than the upper limit of the mass-to-charge ratio limited in the measurement period.

While in the first and the second embodiments, ions on the larger m/z side are blocked by controlling the direct current voltage applied to the quadrupole mass filter 12, it is possible to similarly block ions on the larger m/z side also by controlling the direct current voltage applied to the multipole ion guide 11 of the previous stage. However, normally, a DC bias voltage is applied to such the ion guide 11, but a direct current voltage corresponding to the direct current voltage U for ion selection applied to the quadrupole mass filter 12 is not applied. For this reason, when it is desired that ions on the larger m/z side are blocked in the ion guide 11, it is necessary to add a direct current voltage generator that is capable of applying, to the ion guide 11, a voltage corresponding to the direct current voltage U applied to the quadrupole mass filter 12.

While the embodiments described above are application of the present invention to a Q-TOF mass spectrometer capable of MS/MS spectrometry, the present invention can be applied to mass spectrometers such as OA-TOFMS capable of only a normal mass spectrometry. For example, in an OA-TOFMS, an ion guide should be arranged in a previous stage of an orthogonal accelerator and ion blockage should be made possible in the ion guide.

Furthermore, the previous embodiments are mere examples of the present invention, and any change, modification or addition appropriately made within the spirit of the present invention will evidently fall within the scope of claims of the present application.

REFERENCE SIGNS LIST

1 . . . Chamber
2 . . . Ionization Chamber
3 . . . First Intermediate Vacuum Chamber
4 . . . Second Intermediate Vacuum Chamber
5 . . . Third Intermediate Vacuum Chamber
6 . . . High Vacuum Chamber
7 . . . ESI Spray
8 . . . Heated Capillary
10 . . . Skimmer
9, 11, 14 . . . Ion Guide
12 . . . Quadrupole Mass Filter
13 . . . Collision Cell
15 . . . Ion Passage Hole
16 . . . Ion Transport Optical System
17 . . . Orthogonal Accelerator
20 . . . Flight Space
21 . . . Reflector
22 . . . Back Plate
23 . . . Ion Detector
30 . . . Dara-Processing Unit
40 . . . Quadrupole Voltage Generator
41 . . . Radio-Frequency Voltage Generator
42 . . . Direct Current Voltage Generator
43 . . . Adder
50 . . . Control Unit
51 . . . m/z Selection Voltage Setting Unit
52 . . . m/z Range Limitation Voltage Setting Unit
53 . . . Input Unit

The invention claimed is:

1. A mass spectrometer comprising:

an ion source configured to ionize a sample component;

a time-of-flight mass spectrometry unit that repeatedly performs mass spectrometry in a predetermined measurement period and includes:

a flight space in which ions fly, an ejection unit that gives a predetermined energy to ions generated in the ion source or ions derived from the ions and ejects the ions towards the flight space, and a detector configured to detect ions having flown in the flight space;

an ion transport unit that includes a multipole electrode provided between the ion source and the ejection unit;

a voltage generator configured to apply, to the multipole electrode, a voltage, obtained by adding a radio-frequency voltage and a direct current voltage, for forming a multipole electrical field in which ions within a range of equal to or larger than a predetermined mass-to-charge ratio with which the time of flight in the flight space exceeds at least the predetermined measurement period when ions pass through a space surrounded by the multipole electrodes are diffused; and a control unit configured to control the voltage generator in such a manner that an inclination of a mass scanning line set so as to pass an origin and through a stability region on a Mathieu diagram where a "q" value and an "a" value, which are parameters based on a Mathieu equation, are adopted for the two axes is changed in accordance with mass scanning over a mass-to-charge-ratio range of a measurement target and that a direct current voltage and a radio-frequency voltage changing in response to a change in the inclination of the mass scanning line are applied to the multipole electrode, wherein: the control unit changes a direct current voltage in accordance with scanning of the radio-frequency voltage in such a manner that the upper limit of the mass-to-charge ratio of ions passing through the ion transport unit is maintained approximately constantly; and heavy ions with a mass-to-charge ratio above the mass-to-charge ratio upper limit are blocked in accordance with the predetermined measurement period such that the heavy ions that cause period delay are prevented from being introduced into the ejection unit.

2. The mass spectrometer according to claim 1, further comprising:

a quadrupole mass filter selectively allowing an ion having a specific mass-to-charge ratio to pass through; and a collision cell used for dissociating an ion provided between the quadrupole mass filter and the ejection unit, wherein the quadrupole mass filter is used as the ion transport unit.

3. A mass spectrometer comprising:

an ion source configured to ionize a sample component;

a quadrupole mass filter capable of selecting an ion having a specific mass-to-charge ratio among ions generated in the ion source;

a collision cell configured to dissociate the ion selected in the quadrupole mass filter;

a time-of-flight mass spectrometry unit that includes a flight space in which ions fly, an ejection unit that gives a predetermined energy to ions generated in the ion source or ions generated by ion dissociation in the collision cell and ejects the ions towards the flight space, and a detector configured to detect ions having flown in the flight space a voltage generator that applies, to each electrode of the quadrupole mass filter, a voltage obtained by adding a radio-frequency voltage and a direct current voltage; and a control unit configured to control the voltage generator in order to change a direct current voltage in accordance with scanning of the radio-frequency voltage in such a manner that an inclination of a mass scanning line that is a straight line passing through an origin on a Mathieu diagram where a “q” value and an “a” value, which are parameters based on a Mathieu equation, are adopted for two axes is adjustable within a predetermined range between a horizontal state where a=0 and a predetermined inclination state where the mass scanning line passes through a base of a stability region, and that the upper limit of the mass-to-charge ratio of ions passing through the quadrupole mass filter is maintained approximately constantly, wherein, heavy ions with a mass-to-charge ratio above the mass-to-charge ratio upper limit are blocked in accordance with the predetermined measurement period such that the heavy ions that cause period delay are prevented from being introduced into the election unit.

4. The mass spectrometer according to claim 3, selectably including, as operation modes of the quadrupole mass filter:

a first mode in which the inclination of the mass scanning line is set such that, on the Mathieu diagram, the mass scanning line passes through a predetermined range near a top of a stability region; and a second mode in which, on the Mathieu diagram, the inclination of the mass scanning line is adjustable within a predetermined range between a horizontal state and the predetermined inclination state, and a direct current voltage is changed in accordance with scanning of the radio-frequency voltage in such a manner that the upper limit of the mass-to-charge ratio of ions passing through the quadrupole mass filter is maintained approximately constantly, wherein the control unit controls the voltage generator in order to change each of a radio-frequency voltage and a direct current voltage in such a manner that the inclination of the mass scanning line is gradually changed in accordance with scanning of mass-to-charge ratio from a mass scanning line with a designated inclination when the second mode is selected.

* * * * *